2,830,894

PRODUCTION OF URANIUM

Frank H. Spedding and Harley A. Wilhelm, Ames, Iowa, and Wayne H. Keller, St. Louis, Mo., assignors to the United States of America as represented by the United States Atomic Energy Commission No Drawing. Application November 7, 1947
Serial No. 784,766

2 Claims. (Cl. 75—84.1)

This invention relates to the production of uranium metal by the reduction of uranium tetrafluoride with magnesium and to the recovery of massive uranium metal of high purity from the reaction mixture.

During the development of the atomic bomb, the production of uranium and plutonium isotopes, viz., $U^{235}$ and $Pu^{239}$ respectively, the latter by neutron irradiation of purified uranium, became very important. Their production required the large-scale manufacture of uranium metal of high purity. The methods of preparing uranium that were described in the literature were found to be unsatisfactory for this purpose.

Uranium metal had been prepared by electrolytic methods in only small quantities.

Uranium oxide had been reduced by reaction with a metal, such as calcium, magnesium, and aluminum, but only a powder was produced.

A double salt of unanimum halide, viz., $KUF_5$, had been reduced by calcium in the presence of calcium chloride, by the method described in U. S. Patent No. 1,814,721. A uranium powder was obtained, which after separation from the slag was converted to a coherent mass of uranium by subsequent heating in a high vacuum or inert invironment. Thus, the heat of reaction was insufficient to raise the temperature of the reaction mixture above the melting point of uranium and slag to permit separation of liquid uranium. This method required several steps, the use of calcium chloride as well as expensive calcium, and an excessive heat requirement to convert the powder to a coherent mass of uranium.

In British Patent No. 230,865 the method described for the manufacture of fused uranium consisted of heating an oxide-free double salt of uranium, specifically $KUF_5$, with a reducing substance such as magnesium. High-vacuum equipment with a very large heat capacity was required since the highest vacuum maintainable was used and sufficient heat had to be introduced to distill magnesium and volatile salts from the uranium, which was fused by this high-temperature removal of magnesium and salts. In other words, the separation of uranium from other products and from starting materials was effected by expensive volatilization rather than gravity separation of uranium to form a bottom layer.

Goggin et al. reported in Industrial and Engineering Chemistry, 18, pp. 114–116 (1926), that uranium chloride was reduced by calcium to produce fused uranium. Since uranium chloride is hygroscopic, it is difficult to prepare and keep it in the anhydrous condition. The hydrolyzed product is uranium dioxide which requires high temperatures for reduction. At any rate, it was found that the method of Goggin et al. resulted in low yields of massive uranium.

In summary, it may be stated that none of the methods reported in the literature was satisfactory for the large-scale production of massive unranium of high purity. Various modifications of these methods were tried without substantial success. They produced uranium metal that was considerably contaminated with oxides, nitrides, carbides, boron, and other impurities. The poor quality of uranium metal so produced is apparent from the uncertainty of the melting point of uranium. Chemical handbooks reported the melting point only as $<1800°$ C. The melting point of uranium of high purity is now known to $1132°$ C. The higher values are due to impurities, such as oxides. These impurities have a marked effect on yield when massive uranium is cast.

Another method of producing massive uranium was developed by others on the "Atomic Bomb Project," and while it was a considerable improvement over the processes of the prior art mentioned above, it was not entirely satisfactory. The method consisted of adding alternately to a crucible heated to a high temperature, such as 1000 to $1200°$ C., uranium tetrafluoride and magnesium while circulating argon in contact with the reactants. The pressure of the system was substantially atmospheric, and the reaction was carried out using less than the stoichiometric amount of magnesium. After completion of the reaction, the reaction mixture was raised in temperature to melt the reaction mixture of uranium and slag so that they would separate to produce massive uranium. After cooling the massive metal was obtained by breaking the crucible and separating the uranium ingot from the slag. By this method the yield was less than 50% based on uranium content of uranium tetrafluoride used. With modifications of it, including the addition of a low-melting flux, such as calcium fluoride, a maximum of 81% of the theoretical yield of pure uranium was obtained.

It is an object of this invention to produce uranium metal of high purity.

Another object of this invention is to provide a method for the production of massive uranium.

A further object is to provide a process for producing massive uranium from a heterogeneous mixture of uranium and magnesium fluoride.

Still a further object of the present invention is to provide a method of producing and recovering uranium metal suitable for use in a neutronic reactor for the production of $Pu^{239}$.

Other objects and advantages of this invention will become apparent as the following description progresses.

We have found that uranium metal and especially massive uranium of high purity can be produced by reacting uranium tetrafluoride with magnesium at a temperature above the melting point of uranium, viz., at 1150 to $2000°$ C. and in the presence of a superatmospheric pressure of magnesium vapor. There are several embodiments of this invention by which the reactants, and more especially the reaction products reach that temperature range, but in all cases the fusion of uranium metal and slag with subsequent separation of liquid uranium occurs in the presence of a superatmospheric pressure of magnesium vapor.

In the preferred embodiment of the present invention uranium tetrafluoride and magnesium, in which magnesium is present in an amount greater than the stoichiometric amount, are heated, preferably as an intimate mixture, in a closed system in a heating chamber maintained between about 500 and $1000°$ C., to a temperature at which uranium tetrafluoride and magnesium react, and the closed system with contents is maintained in the heating chamber for a sufficient length of time to allow separation of liquid uranium and liquid slag containing primarily magnesium fluoride into two layers. The products are obtained in the liquid form since the temperature in the closed system reaches 1150 to $2000°$ C. This temperature range is attained by the combination of the preheating step, i. e., raising the reactants to the temperature at which reaction is initiated, and the heat of reaction with the minimizing of heat dissipation from the closed system.

In this process the excess amount of magnesium is preferably less than 50% and the preferred range is between 2 and 20%. If a larger excess is used it absorbs sufficient heat from the heat of reaction between uranium tetrafluoride and magnesium so that the necessary temperature range of 1150 to 2000° C. is not reached, with the result that massive uranium is not produced. It is for this reason that a composition consisting of magnesium and uranium tetrafluoride is preferably used.

The heat dissipation from the closed system is minimized by the combination of lining the closed system with a heat-insulating material and maintaining the system in the heating chamber. At the high end of the temperature range for the heating chamber there is no necessity for insulation of the closed system, since heat dissipation is so slow that it does not prevent reactants and products reaching 1150 to 2000° C. At the low end of the temperature range of the heating chamber, the closed system must be heat-insulated and a suitable insulating liner is lime having a high calcium content. The liner thickness may be varied widely, but the preferred thickness is between ⅛ and ½″. Too thick a liner for the closed system is undesirable since it requires an uneconomically long time for the heating chamber to heat the mixture of uranium tetrafluoride and magnesium to the temperature at which reaction occurs. The required thickness varies with the size of the closed system and the amounts of uranium tetrafluoride and magnesium used.

The time required for an adequate separation of uranium as a liquid layer within the closed system depends upon many factors, including the amounts of products and the dimensions of the closed system. Settling time ranges between less than a minute to several hours.

After settling, the uranium may be poured off while in the liquid state or the closed system may be cooled and the massive uranium separated from the solidified magnesium fluoride.

The heat for this process may be supplied to the closed system by any one of several means, such as by the use of a gas-fired furnace, an induction furnace and a resistance furnace. The gas-fired furnace is the preferred equipment for the heating chamber.

The following examples are illustrative of this preferred embodiment of the present invention.

*Example I*

A mixture of 2016 g. of uranium tetrafluoride and 400 g. magnesium (representing a 28% excess of magnesium) was placed in a steel bomb provided with a high calcium content lime liner and the bomb was securely closed. It was heated in a Chromel-wound resistance furnace maintained at about 650° C. Reaction of the contents of the bomb occurred when the outside of the bomb reached 640° C. and a yield of 80.5%, based on weight of uranium in the uranium tetrafluoride used, of clean, compact, massive uranium metal was obtained. (In later experiments using this equipment yields up to 95% of uranium were obtained.)

*Example II*

A bomb was constructed of standard 6″ pipe, 36″ in length, with a welded bottom of ⅜″ steel plate. The upper end was fitted with a standard threaded flange. The bomb was provided with a refractory lining comprising a layer of ground electrically-fused dolomitic lime that was applied by jolting into an annular space between the bomb wall and a 5⅛″ steel mandrel placed concentrically within the bomb. A reaction mixture consisting of 56 lbs. of uranium tetrafluoride and 9 lbs. and 4 ozs. of magnesium, i. e., 7.5% above the stoichiometric amount of magnesium, was prepared by thorough mixing. The uranium tetrafluoride consisted of particles all of which were smaller than 100 mesh and the magnesium particles all of which were smaller than 10 mesh. This mixture was placed in the bomb and covered with a layer of the electrically-fused dolomitic lime. The bomb was closed by bolting a blank flange to the upper end of the bomb. The bomb was placed in a preheated gas furnace which was kept at 650° C. After approximately 50 minutes the ingredients of the mixture increased in temperature sufficiently to initiate a reaction between them. The contents of the bomb rose rapidly in temperature and the pressure within the bomb rose to several atmospheres. A few minutes after the reaction had initiated the bomb was removed from the gas-fired furnace and cooled by a water spray. After several hours, the bomb and its contents were sufficiently cooled to handle and to expose to the air. Upon opening the bomb, it was found that an ingot of uranium metal had formed at the bottom of the bomb. A 96% yield, based on the weight of uranium in uranium tetrafluoride used, was obtained. The ingot was remelted in a graphite furnace at an absolute pressure of less than 1 mm. of mercury and at a temperature of 1250 to 1300° C. After volatile impurities had distilled, the uranium was cast in a mold. It was found to be extremely pure, containing less than 45 p. p. m. of iron, less than 25 p. p. m. of manganese, less than 0.3 p. p. m. of cadmium, less than 0.22 p. p. m. of boron, and less than 10 p. p. m. of magnesium.

In a modification of this embodiment, no excess magnesium is present in the original mixture. Instead, it is added after the contents of the closed system reach a minimum of 1150° C., in order to provide a superatmospheric pressure of magnesium vapor.

In a second embodiment of this invention a mixture of uranium tetrafluoride and magnesium is heated in a closed system to a temperature between about 1150 and 2000° C. under a superatmospheric pressure of magnesium vapor and the contents of the closed system are maintained within that temperature range for a short time to allow the separation of liquid uranium and liquid slag containing magnesium fluoride.

This is a broader embodiment of the invention, since there is no requirement that the closed system be within a heating chamber maintained at 500 to 1000° C. For example, the minimum temperature of 1150° C. may be attained by a combination of heat of reaction and heat added to the contents of the closed system after the reduction reaction has substantially occurred.

The superatmospheric pressure of magnesium vapor at 1150 to 2000° C. may be provided by using more than the stoichiometric amount of magnesium in the starting mixture or the excess magnesium may be added later, including the period when the contents of the closed system are between 1150 and 2000° C. The use of excess magnesium in the initial mixture is the preferred method and sufficient excess is used to provide preferably 2 to 20% excess. Preferably, in this and the other embodiments, for a definite amount of reaction mixture the closed system is sufficiently small so that part of the excess magnesium is in the liquid state.

In a third embodiment of the present invention the mixture of uranium tetrafluoride and magnesium is heated in a closed system in a heating chamber at a temperature between about 300 and 1000° C. When the mixture has reached a temperature between about 200 and 400° C. reaction is initiated by passing an electric current through a fuse wire that is in contact with the mixture of uranium tetrafluoride and magnesium. With adequate heat insulation of the closed system the temperature of the contents of the closed system will rise rapidly to between 1150 and 2000° C., within which temperature range a superatmospheric pressure of magnesium vapor results. The contents of the closed system are kept within this temperature range for a sufficient length of time to allow separation of liquid uranium and liquid magnesium fluoride into two layers. It is preferable to use a fuse wire made from uranium to reduce to a minimum the possible contamination of uranium produced.

In another embodiment of this invention a mixture of uranium tetrafluoride and the stoichiometric amount of magnesium may be heated to a temperature at which the reaction between them will be initiated. In this process, due to rapid heat dissipation, the preheat supplied along with the heat of reaction will not carry the reactants to a temperature at which uranium and magnesium fluoride will melt. Thus, a heterogeneous mixture of uranium and magnesium tetrafluoride will be produced. This heterogeneous mixture is heated in a closed system in the presence of magnesium to a temperature between 1150 and 2000° C., in order to fuse uranium and magnesium tetrafluoride and to provide a superatmospheric pressure of magnesium vapor. The fused material is maintained within this temperature range sufficiently long to allow a separation of liquid uranium and liquid magnesium fluoride. The amount of magnesium used is preferably between 2 and 20% based on the magnesium content of magnesium fluoride present.

In each embodiment a low-melting flux may be used with the starting material in order to lower the melting point of the magnesium fluoride slag produced. Suitable fluxes include magnesium chloride, sodium chloride, and potassium fluoride. They are used in an amount of less than 50% by weight, based on the weight of magnesium fluoride that theoretically will be produced by the reduction reaction. Using a larger amount, too much heat would be absorbed by the flux, and this would affect too adversely the economics of some embodiments. More important, in other embodiments, the reaction products would not reach 1150° C. and only uranium powder would be produced.

The closed system may initially be under a vacuum or contain an inert gas such as argon or hydrogen.

In any of the various embodiments, the starting mixture may be modified to include a compound which has a considerably greater heat of reaction with magnesium than does uranium tetrafluoride. In such cases sufficient additional magnesium is used to react with such compound as well as to provide a superatmospheric pressure of magnesium vapor. Examples of such compounds, which may be called heat or thermal boosters, are alkali metal chlorates, alkali metal bromates, alkali metal perchorates, and alkali metal persulfates, such as the potassium salts, and halogens, such as iodine. The following examples are illustrative.

*Example III*

In a bomb of the type described in Example II a reaction mixture consisting of 3030 g. of uranium tetrafluoride, 763 g. of magnesium, and 172 g. of potassium chlorate was introduced. It was sufficient to fill the bomb. The reaction was initiated by an electrically-heated fuse wire of uranium and an ingot weighing 1877 grams of massive uranium metal was obtained. This was a yield of 82%.

*Example IV*

The process of the above Example III was repeated with a reaction mixture comprising 12.4 lbs. of uranium tetrafluoride, 2.94 lbs. of magnesium, and 0.65 lb. of potassium persulfate. The charge was packed in a bomb 4″ in diameter and 24″ long. The reaction was initiated by an electrically-heated fuse wire of uranium extending into the charge. During the reaction the pressure within the bomb rose rather substantially. An ingot of metal weighing 9.25 lbs., i. e., a 98% yield, was obtained.

At the desired temperature range, if magnesium is absent the reaction products have a tendency to revert to starting materials according to the following equation:

$$U + 2MgF_2 \rightarrow UF_4 + 2Mg$$

Magnesium vapor reduces the tendency for this reaction to take place. Furthermore, magnesium vapor and liquid magnesium remove the oxygen present in the air in the closed system by reacting with it to form magnesium oxide and the presence of magnesium vapor under superatmospheric pressure reduces the tendency for the following reaction to take place:

$$2MgO + U \rightarrow 2Mg + UO_2$$

Also, it is believed that the magnesium aids in the separation of uranium from the magnesium fluoride slag. The foregoing are possible reasons for the requirement in the process of this invention for a superatmospheric pressure of magnesium, but this invention is not to be limited by the particular mechanisms proposed.

The particle size of uranium fluoride and magnesium had some effect on the yield. It was found that the optimum yield was obtained using uranium tetrafluoride ground to smaller than 100 mesh, but only 60% of which was smaller than 325 mesh, and using magnesium with a particle size between 10 and 40 mesh.

It is important that the uranium tetrafluoride used be substantially free of uranium dioxide to obtain high yields. The following table illustrates the effect of uranium dioxide content of uranium tetrafluoride on the uranium yield when using 7.5% excess magnesium.

| Percent $UO_2$ in $UF_4$ | Crude Yield, Percent | Casting Yield, Percent | Overall Yield, Percent |
| --- | --- | --- | --- |
| 0.75 | 90.6 | 93.0 | 85.0 |
| 1.56 | 90.4 | 92.6 | 83.6 |
| 2.92 | 88.9 | 93.2 | 82.8 |
| 8.23 | 73.5 | 80.2 | 58.9 |
| 11.44 | 71.6 | 67.1 | 48.0 |

The casting yield was dependent upon the purity of the crude product. These results demonstrate that the starting material, viz., $UO_2$, of some of the methods of the prior art, is an unsatisfactory material for the process of this invention, since its presence substantially lowers the purity of the crude product as well as yield of massive uranium metal.

While various embodiments of the present invention have been described, the invention is not limited to these and the equipment described, but encompasses other modifications that may be made without departing from the scope and spirit of the invention. Therefore, it is not intended to be limited except as defined by the following claims.

This application is a continuation-in-part of our co-pending applications, Serial No. 513,996, filed December 11, 1943, now abandoned, and Serial No. 523,556, filed February 23, 1944, now Patent No. 2,787,538, issued April 2, 1957.

What is claimed is:

1. A process for the production of massive uranium which comprises placing a closed system containing a mixture consisting of uranium tetrafluoride and magnesium in a heating chamber maintained at a temperature between 500° and 1000° C., maintaining the closed system containing said mixture in the heating chamber to heat up the mixture to a temperature at which uranium tetrafluoride and magnesium react with the production of uranium and magnesium fluoride, and maintaining the resultant reaction products at above the melting points of both the uranium metal and the magnesium fluoride and under superatmospheric pressure of magnesium vapor for a sufficient length of time to allow separation of liquid uranium and liquid magnesium fluoride into two layers.

2. The process of claim 1 wherein the magnesium is used in an excess of about 2 to 20% of the stoichiometric amount and the closed system is of such size that part of the excess magnesium is in the liquid state.

References Cited in the file of this patent

UNITED STATES PATENTS 705,727     Weber               July 29, 1902

(Other references on following page)